(12) United States Patent
Loccufier

(10) Patent No.: US 12,552,951 B2
(45) Date of Patent: *Feb. 17, 2026

(54) AQUEOUS DISPERSION OF POLYMERIC CAPSULES

(71) Applicant: AGFA NV, Mortsel (BE)

(72) Inventor: Johan Loccufier, Mortsel (BE)

(73) Assignee: Agfa NV, Mortsel (BE)

( * ) Notice: Subject to any disclaimer, the term of this patent is extended or adjusted under 35 U.S.C. 154(b) by 831 days.

This patent is subject to a terminal disclaimer.

(21) Appl. No.: 17/785,134

(22) PCT Filed: Dec. 14, 2020

(86) PCT No.: PCT/EP2020/085899
§ 371 (c)(1),
(2) Date: Jun. 14, 2022

(87) PCT Pub. No.: WO2021/122411
PCT Pub. Date: Jun. 24, 2021

(65) Prior Publication Data
US 2023/0062153 A1    Mar. 2, 2023

(30) Foreign Application Priority Data
Dec. 17, 2019    (EP) ..................... 19217051

(51) Int. Cl.
| | |
|---|---|
| *C09D 11/38* | (2014.01) |
| *B01J 13/16* | (2006.01) |
| *C08G 18/08* | (2006.01) |
| *C08G 18/62* | (2006.01) |
| *C08G 18/78* | (2006.01) |
| *C09D 11/54* | (2014.01) |

(52) U.S. Cl.
CPC ............... *C09D 11/38* (2013.01); *B01J 13/16* (2013.01); *C08G 18/0819* (2013.01); *C08G 18/6233* (2013.01); *C08G 18/7806* (2013.01); *C09D 11/54* (2013.01)

(58) Field of Classification Search
CPC ....... C09D 11/38; C09D 11/54; C09D 11/102; C09D 11/30; C09D 11/40; C09D 11/10; C08G 18/6233; C08G 18/7806; C08G 18/7831; C08G 18/4018; C08G 18/0819; B01J 13/16
USPC ........................................................ 523/201
See application file for complete search history.

(56) References Cited

U.S. PATENT DOCUMENTS

| | | | |
|---|---|---|---|
| 6,037,390 A | 3/2000 | Page et al. | |
| 2005/0239920 A1 | 10/2005 | Ono et al. | |
| 2015/0132372 A1* | 5/2015 | Benameur | A61K 47/10 264/301 |
| 2019/0023922 A1 | 1/2019 | Koyama et al. | |
| 2019/0249024 A1 | 8/2019 | Shinohara et al. | |
| 2019/0367762 A1 | 12/2019 | Loccufier | |
| 2020/0115575 A1* | 4/2020 | Desmet | D06P 1/5278 |
| 2023/0167319 A1* | 6/2023 | Loccufier | C08L 75/02 523/201 |
| 2023/0174804 A1* | 6/2023 | Loccufier | C08G 18/7831 347/21 |

FOREIGN PATENT DOCUMENTS

| | | |
|---|---|---|
| EP | 0280561 A2 | 8/1988 |
| EP | 2626390 A2 | 8/2013 |
| EP | 3156463 A1 | 4/2017 |
| JP | S63-229366 A | 9/1988 |
| JP | H07-102218 A | 4/1995 |
| JP | 2003-533563 A | 11/2003 |
| JP | 2005-307028 A | 11/2005 |

(Continued)

OTHER PUBLICATIONS

European Patent Office, International Search Report in International Patent Application No. PCT/EP2020/085899, mailed Jun. 25, 2021, 6 pp.

(Continued)

*Primary Examiner* — Hannah J Pak
(74) *Attorney, Agent, or Firm* — Leydig, Voit & Mayer, Ltd.

(57) ABSTRACT

An aqueous dispersion of capsules, comprise a polymeric shell surrounding a core, the core comprises an oligomer or polymer having at least 3 repeating units comprising a functional group according to general formula (I), (II) or (III) The dispersion of the capsules can be incorporated in an aqueous pigmented inkjet ink.

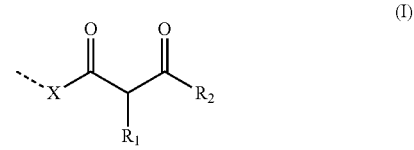

(I)

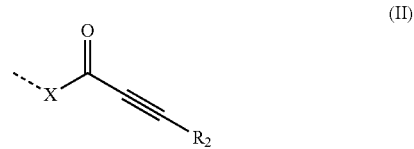

(II)

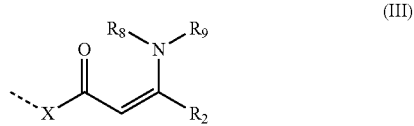

(III)

18 Claims, No Drawings

(56) References Cited

FOREIGN PATENT DOCUMENTS

| | | |
|---|---|---|
| WO | WO 2001/088002 A1 | 11/2001 |
| WO | WO 2016/122569 A1 | 8/2016 |
| WO | WO 2016/165956 A1 | 10/2016 |
| WO | WO 2018/077624 A1 | 5/2018 |
| WO | WO 2018/138069 A1 | 8/2018 |
| WO | WO 2018/234179 A2 | 12/2018 |

OTHER PUBLICATIONS

European Patent Office, Written Opinion in International Patent Application No. PCT/EP2020/085899, mailed Jun. 25, 2021, 10 pp.

\* cited by examiner

AQUEOUS DISPERSION OF POLYMERIC CAPSULES

CROSS-REFERENCE TO RELATED APPLICATIONS

This patent application is the U.S. national phase of copending International Patent Application No. PCT/EP2020/085899, filed Dec. 14, 2020, which claims the benefit of European Patent Application No. 19217051.2, filed Dec. 17, 2019.

TECHNICAL FIELD

The present invention relates to aqueous dispersions of capsules having a core comprising an oligomer or polymer for use in printing and more specifically in inkjet printing with aqueous resin based inkjet inks on non-absorbing substrates.

BACKGROUND ART

The industrial applications of ink jet are expanding into more and more fields of technology, having to meet ever more demanding physical properties. Industrial printing technology has to be compatible with cheap substrates, which are often poly(olefin) based. It is known in the industry that adhesion to poly(olefins) is often very difficult.

Until now, ink jet technology on non-absorbing substrates, including poly(olefins) has been UV based. However, aqueous technology is gradually gaining ground also on non-absorbing substrates. Adhesion of aqueous resin based inks directly on poly(olefins) remains even more difficult compared to UV technology.

Several approaches are known in the art to improve adhesion of aqueous inks, including corona treatment, flame treatment of the substrate and priming of the substrate with primers containing resins such as polyurethane resins. Pre-treating the substrate with corona and flame treatment complicates the work flow and does not always solve the adhesion problem.

Aqueous based primers or aqueous based inkjet inks containing resins such as polyurethane resins have been designed to improve image durability such as scratch resistance, abrasion resistance and chemical resistance. WO 2018/077624 describes aqueous inkjet inks comprising a polyurethane resin having dispersing groups providing electronic and steric colloidal stabilisation. WO 2016/122569 teaches a primer solution comprising a polyurethane resin having a specific glycol. Aqueous inks and primers still suffer from insufficient adhesion to poly(olefin) substrates. Moreover, the use of resins dispersed or dissolved in an aqueous ink or primer which has to be jetted via e.g. an inkjet head causes problems of jetting reliability. This may be due to film formation of the resin at the nozzle plate causing clogging of the nozzles when the inkjet head is not in use for some time.

In WO 2016/165956 aqueous resin based inkjet inks are described wherein the resin is present as a capsule to improve the jetting reliability of resin based inks. However, to achieve good binding properties and hence durable images, reactive chemistry such as blocked isocyanates is incorporated in the core of the capsule. The presence of such reactants may give health and safety issues when not completely reacted. Moreover, the release of the reactive chemistry from the core, requires a thermal activation step during or after drying the ink. The thermal activation step comprises the heating of the printed image up to temperatures above 100° C. which is not compatible with poly(olefin) based substrates such as polyethylene or polypropylene films.

US 2019/0023922 discloses inkjet inks containing capsules having a core which comprises polymerisable compounds such as a polymerisable oligomer or polymer. The polymerisable compound are compounds which polymerize only upon applying UV-light or blocked isocyanates.

Therefore, there is still a need for a resin technology that intrinsically shows a good adhesion performance to poly(olefins), and at the same time can be incorporated in inkjet inks or jettable primers providing reliable jetting performances.

SUMMARY OF INVENTION

It is the objective of the present invention to provide a solution to the above stated problem. The objective has been achieved by providing a dispersion of capsules as defined in claim 1.

It is further an object of the present invention to provide an inkjet ink comprising the capsules of claim 1 as defined in claim 7.

It is another embodiment of the invention to provide a printing method using inkjet inks comprising capsules of claim 1 as defined in claim 9.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Aqueous Dispersion According to the Invention
A.1. Oligomer or Polymer According to the Invention The objectives of the present invention are realized by an aqueous dispersion comprising a capsule comprising a core surrounded by a polymeric shell, wherein the core comprises an oligomer or polymer, having at least 3 repeating units comprising a functional group according to general formula I, II or III

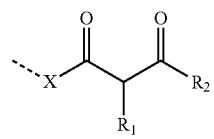
general formula I

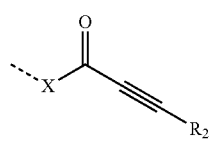
general formula II

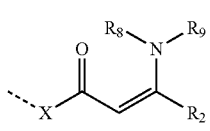
general formula III wherein
$R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, C(=O)R$_3$ and CN R$_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group and C(=O)R$_3$ R$_1$ and R$_2$ may represent the necessary atoms to form a five to eight membered ring R$_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, OR$_4$ and NR$_5$R$_6$ R$_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group R$_5$ and R$_6$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group R$_5$ and R$_6$ may represent the necessary atoms to form a five to eight membered ring X is selected from the group consisting of O and NR$_7$ R$_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group R$_8$ and R$_9$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group R$_8$ and R$_9$ may represent the necessary atoms to form a five to eight membered ring.

In a preferred embodiment said oligomer or polymer comprising repeating units functionalized with a moiety according to general formula I, comprise at least 7 functionalized, more preferably at least 10 and most preferably at least 15 functionalized repeating units.

In a further preferred embodiment, X represents an oxygen. In an even further preferred embodiment, R$_1$ represents a hydrogen. In an even further preferred embodiment R$_2$ represent a substituted or unsubstituted alkyl group, unsubstituted being more preferred, a lower alkyl group being even more preferred and a methyl group being the most preferred.

The oligomer or polymer according to the present invention preferably has a weight average molecular weight of at least 2000, more preferably 4000 and most preferably between 6000 and 30000.

The polymer according to the present invention can be a homopolymer or a copolymer of different repeating units.

Oligomers or polymers according to the present invention can be prepared by addition polymerization of ethylenically unsaturated monomers, polycondensation and ring opening polymerization, addition polymerization being particularly preferred. In the most preferred embodiment, free radical polymerization of ethylenically unsatured monomers is used to prepare the resins according to the present invention. In another embodiment of the present invention, the molecular weight of the resins according to the present invention is controlled using RAFT agents, ATRP, nitroxyl radical technology or transfer agents, preferably thiols.

Typical monomers for the preparation of resins according to the present invention are given below without being limited thereto. Monomers for addition polymerization: See Table 1.

TABLE 1

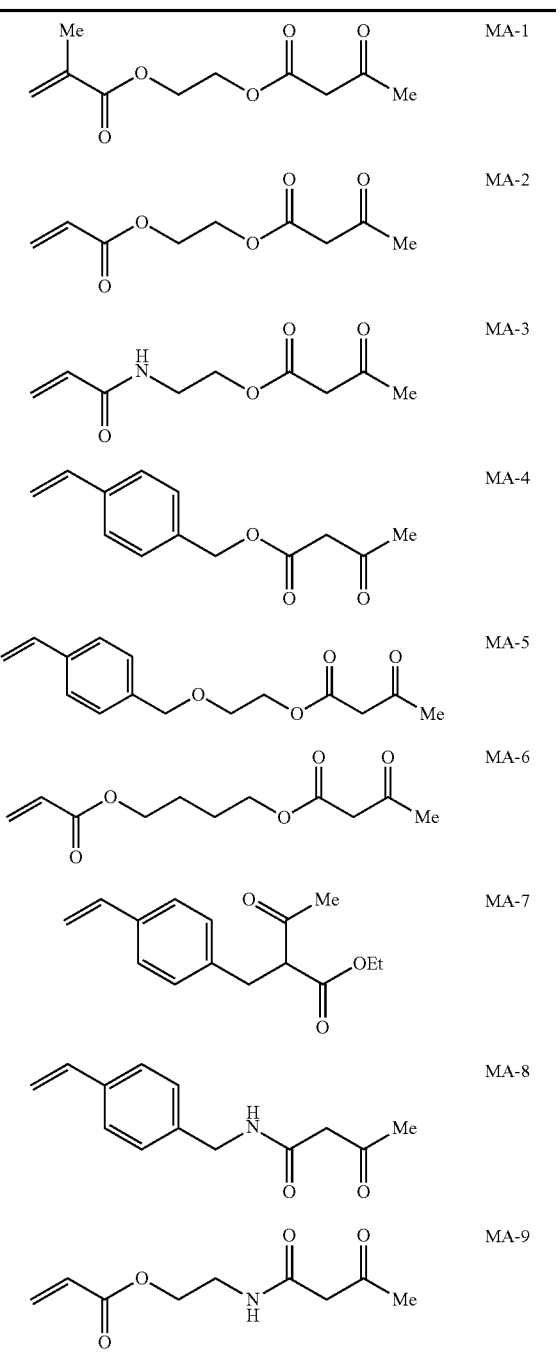

TABLE 1-continued

MA-10, MA-11, MA-12, MA-13, MA-14, MA-15

Free radical and cationic polymerization conditions are preferred to prepare addition polymers according to the present invention.

Monomers for ring opening polymerization: see Table 2

TABLE 2

MR-1, MR-2

TABLE 2-continued

MR-3, MR-4, MR-5, MR-6

Poly(ethers), poly(esters), poly(carbonates) and poly(amides) or copolymers thereof can be prepared using ring opening polymerization circumstances documented in the scientific literature.

Monomers for polycondensation: see Table 3.

TABLE 3

MP-1, MP-2, MP-3, MP-4

TABLE 3-continued

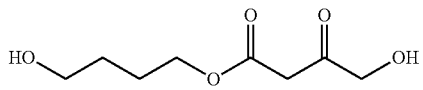  MP-5

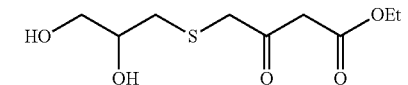 [SMILES: CCOC(=O)CC(=O)CSCC(O)CO]  MP-6

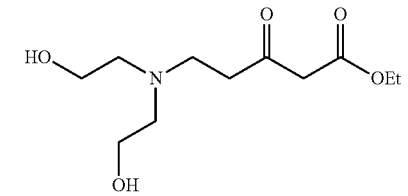 [SMILES: CCOC(=O)CC(=O)CCN(CCO)CCO]  MP-7

Poly(esters) can be prepared by condensation of functionalized diols with di-acids or di-acid chlorides under conditions known to those skilled in the art. Functionalized di-acids can be converted into poly(esters) by condensation with a diol. Poly(urethanes) can be prepared by condensation of functionalized diols with di-isocyanates under conditions known to those skilled in the art.

A.2. Capsules According to the Invention

The oligomer or polymer according to the present invention are encapsulated to form an aqueous dispersion, preferably by polymerization, more preferably by using interfacial polymerization.

The capsules are preferably present in a pre-treatment liquid (or primer), an over-print varnish or a printing ink, more preferably an inkjet ink in amount of no more than 45 wt. %, preferably between 5 and 25 wt. % based on the total weight of the liquid/varnish/ink. It was observed that above 30 wt. %, jetting was not always reliable.

The capsules to be used in a jettable aqueous formulation such as an inkjet ink or jettable pre-treatment liquid, have an average particle size of no more than 4 µm as determined by dynamic laser diffraction. The nozzle diameter of inkjet print heads is usually 20 to 35 µm. Reliable inkjet printing is possible if the average particle size of the capsules is five times smaller than the nozzle diameter. An average particle size of no more than 4 µm allows jetting by print heads having the smallest nozzle diameter of 20 µm. In a more preferred embodiment, the average particle size of the capsules is ten times smaller than the nozzle diameter. Hence preferably, the average particle size is from 0.05 to 2 µm, more preferably from 0.10 to 1 µm. When the average particle size of the capsule is smaller than 2 µm, excellent resolution and dispersion stability with time are obtained.

The capsules are dispersed in the aqueous medium of the pre-treatment liquid or inkjet ink using a dispersing group covalently bonded to the polymeric shell or are dispersed by using dispersants or surfactants preferably added during or after the formation of the capsule. The dispersing group covalently bonded to the polymeric shell is preferably selected from the group consisting of a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability of the inkjet ink is accomplished solely by electrostatic stabilization. For example, a slightly alkaline aqueous medium will turn the carboxylic acid groups covalently bonded polymeric shell into ionic groups, whereafter the negatively charged capsules have no tendency to agglomerate. If sufficient dispersing groups are covalently bonded to the polymeric shell, the capsule becomes a so-called self-dispersing capsule.

These negatively or positively charged capsule surfaces can also be advantageously used during inkjet printing. For example, a second liquid such as a pre-treatment liquid containing a cationic substance, being a cationic polymer or multivalent salt, can be used to precipitate anionic stabilized colorants of the aqueous inkjet ink printed on top of the second liquid. By using this method an improvement in image quality can be observed due to the immobilisation of the capsules.

There is no real limitation on the type of polymer used for the polymeric shell of the capsule. Preferably, the polymer used in the polymeric shell is cross-linked. By crosslinking, more rigidity is built into the capsules allowing a broader range of temperatures and pressures for handling the capsules in both the ink making and in the inkjet printer.

Preferred examples of the polymeric shell material include polyureas, polyesters, polycarbonates, polyamides, melamine based polymers and mixtures thereof, with polyureas being especially preferred.

A.3. Preparation of the Capsule According to the Invention

The encapsulation of the oligomer or polymer having at least 3 repeating units comprising a functional group according to general formula I, II or III with a polymeric shell, can be prepared using both chemical and physical methods. Suitable encapsulation methodologies include complex coacervation, liposome formation, spray drying and polymerization methods.

In the present invention preferably a polymerization method is used, as it allows the highest control in designing the capsules. More preferably interfacial polymerization is used to prepare the capsules of the invention. This technique is well-known and has been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules according to the present invention are preferably prepared from an oleophilic dispersion in an aqueous continuous phase.

Typical polymeric shells of the capsules according to the invention and formed by interfacial polymerisation are selected from the group consisting of polyamides, typically prepared from di- or poly-acid chlorides as first shell component and di- or oligo-amines as second shell component, polyurea, typically prepared from di- or oligo-isocyanates as first shell component and di- or oligo-amines as second shell component, polyurethanes, typically prepared from di- or oligo-isocyanates as first shell component and di- or oligo-alcohols as second shell component, polysulfonamides, typically prepared from di- or oligo-sulfochlorides as first shell component and di- or oligo-amines as second shell component, polyesters, typically prepared from di- or oligo-acid chlorides as first shell component and di- or oligo-alcohols as second shell component and polycarbonates, typically prepared from di- or oligo-chloroformates as first shell component and di- or oligo-alcohols as second shell component. The shell can be composed of combinations of these polymers.

In a further embodiment, polymers, such as gelatine, chitosan, albumin and polyethylene imine can be used as second shell components in combination with a di- or oligo-isocyanate, a di- or oligo acid chloride, a di-or oligo-chloroformate and an epoxy resin as first shell component.

In a particularly preferred embodiment, the shell is composed of a polyurea or a combination thereof with a polyurethane. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

A water immiscible solvent is an organic solvent having low miscibility in water. Low miscibility is defined as any water solvent combination forming a two phase system at 20° C. when mixed in a one over one volume ratio.

The core contains the oligomer or polymer having at least 3 repeating units comprising a functional group according to general formula I, II or III. These are usually incorporated into the capsules by dissolving it in the organic solvent having low miscibility with water and having a lower boiling point than water. A preferred organic solvent is ethyl acetate, because it also has a low flammability hazard compared to other organic solvents.

However, in some cases the organic solvent may be omitted. For example, the organic solvent can be omitted when the oligomer or polymer, having at least 3 repeating units comprising a functional group according to general formula I, II or III have a viscosity of less than 100 mPa·s.

The method for preparing a dispersion of capsules preferably includes the following steps:
a) preparing a non-aqueous solution of a first shell component for forming the polymeric shell and of the oligomer or polymer, having at least 3 repeating units comprising a functional group according to general formula I, II or III in an organic solvent having a low miscibility with water and having a lower boiling point than water;
b) preparing an aqueous solution of a second shell component for forming the polymeric shell;
c) dispersing the non-aqueous solution under high shear in the aqueous solution;
d) optionally stripping the organic solvent from the mixture of the aqueous solution and the non-aqueous solution; and
e) preparing a polymeric shell around the oligomer or polymer, having at least 3 repeating units comprising a functional group according to general formula I, II or III by interfacial polymerization of the first and second shell component for forming the polymeric shell.

The capsule dispersion can then be completed into an inkjet ink, an aqueous pre-treatment liquid or any liquid suitable in a printing process by addition of e.g. water, humectants, surfactant and the like.

In a preferred embodiment, the capsules are self-dispersing capsules. In order to make capsules self-dispersing, anionic dispersing groups, such as carboxylic acids or salts thereof, sulfonic acids or salts thereof, phosphoric acid esters or a salts thereof or a phosphonic acids or salts thereof, or cationic dispersing groups, such as quaternary ammonium salts, protonated amines, protonated nitrogen containing heteroaromatic compounds, quaternized tertiary amines, N-quaternized heteroaromatic compounds, sulfoniums and phosphoniums may be covalently bonded to the polymeric shell of the capsule to guarantee the dispersion stability.

A preferred strategy to incorporate anionic stabilizing groups into the polymeric shell of a capsule makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphonic acid or salt thereof can be used.

Several amphoteric surfactants, being mixtures of surfactants partially having secondary amines but also comprising tertiary amines are commercially available. Prohibitive foam formation in ink jet inks based on capsules made by using the commercially available amphoteric surfactants was encountered in an inkjet printer. Foaming caused problems in the ink supply and also in the degassing for trying to remove air from the ink, thus leading to unreliable jetting. Therefore, surfactants according to Formula (I) of WO2016/165970 are preferably used during the encapsulation process of the oligomer or polymer, having at least 3 repeating units comprising a functional group according to general formula I, II or III.

Incorporating cationic dispersing groups into the polymeric shell of a capsule for use in a pre-treatment liquid or cationic based inkjet ink (as disclosed in the patent application WO2019/105867), makes use of bonding a surfactant with a cationic dispersing group to the shell of the capsules according to the present invention. This is done by reaction of a surfactant comprising at least one primary or secondary amine group and at least a group selected from protonated amine, a protonated nitrogen containing heteroaromatic compound, a quaternized tertiary amine, a N-quaternized heteroaromatic compound, a sulfonium and a phosphonium with a first shell component, preferably an isocyanate monomer of the shell. In an even more preferred embodiment said surfactant is a surfactant according to Formula IV.

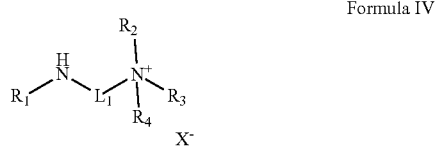

Formula IV wherein $R_1$ is selected from the group consisting of a substituted or unsubstituted alkyl group, a substituted or unsubstituted alkenyl group and a substituted or unsubstituted alkynyl group with the proviso that $R_1$ comprises at least eight carbon atoms;

$R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group $L_1$ represents a divalent linking group comprising no more than eight carbon atoms;

X represents a counterion to compensate the positive charge of the ammonium group.

The capsules according to the invention are dispersed into an aqueous medium. The aqueous medium consists of water, but may preferably include one or more water-soluble organic solvents.

The one or more organic solvents may be added for a variety of reasons.

For example, it can be advantageous to add a small amount of an organic solvent to improve the dissolution of a compound in the pre-treatment liquid or inkjet ink to be prepared. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl pyrrolidone), and acetonitrile.

B. Aqueous Formulations Comprising the Dispersion of the Invention.

B.1. Pre-Treatment Liquid

Aqueous pre-treatment liquids are preferably used in printing with aqueous based inks onto non-absorbing substrates. The aqueous pre-treatment liquid according to the invention comprises the dispersion of capsules composed of a polymeric shell surrounding a core. The core contains an oligomer or polymer having at least 3 repeating units comprising a functional group according to general formula I, II or III. The shell further comprises a dispersing group, preferably covalently bonded to the shell, more preferably, the dispersing group is a group selected from the group consisting of a protonated amine, a protonated nitrogen containing heteroaromatic compound, a quaternized tertiary amine, a N-quaternized heteroaromatic compound, a sulfonium and a phosphonium. The aqueous medium contains water, but may include one or more water-soluble organic solvents. Suitable organic solvents are described in § A.3. If present in the pre-treatment liquid, the capsules are then preferably in an amount of no more than 45 wt. %, more preferably between 5 and 25 wt. % based on the total weight of the pre-treatment liquid.

A multivalent metal ion can be contained in the pre-treatment liquid as a flocculant. Suitable examples are water-soluble metal salts formed from bi-or higher valent metal cations, such as magnesium, calcium, strontium, barium, zirconium, and aluminum, and anions, such as a fluoride ion ($F^-$), a chloride ion (CV), a bromide ion (Br), a sulfate ion ($SO_4^{2-}$), a nitrate ion ($NO_3^-$), and an acetate ion ($CH_3COO^-$).

These polyvalent metal ions have a function of aggregating ink by acting on the carboxyl groups on the surface of the pigment in the ink jet ink, or on the dispersed polymer of capsules contained in the ink. As a result, the colorants of the ink are fixed resulting in a decreased bleeding and beading. Therefore, it is preferred that the surface of the pigment in the ink and/or the dispersed polymer of the capsules, if contained in the ink, have an anionic group, preferably a carboxyl group.

The pre-treatment may also contain organic acids as a flocculant.

Preferred examples of the organic acids include, but are not limited to, acetic acid, propionic acid, and lactic acid.

The pre-treatment liquid may further contain a resin as a flocculant.

Examples of the resin include, but are not limited to, starches; cellulosic materials such as carboxymethyl cellulose and hydroxymethyl cellulose; polyurethanes, polysaccharide; proteins such as gelatine and casein; water-soluble naturally occurring polymers such as tannin and lignin; and synthetic water-soluble polymers such as polymers comprising polyvinyl alcohol, polymers comprising polyethylene oxide, polymers formed from acrylic acid monomers, and polymers formed from maleic anhydride monomers. Other suitable resins are acrylic polymers as described in EP2362014 [0027-0030]. Preferably the resin is a cationic resin, more preferably a cationic charged polyurethane. The resin content is preferably not more than 20 wt. % relative to the total mass of the pre-treatment liquid.

The pre-treatment liquid may also contain humectants. Humectants are preferably incorporated in the pre-treatment liquid if this liquid has to be applied by means of a jetting technique such as inkjet or valve jet. Humectants prevent the clogging of nozzles. The prevention is due to its ability to slow down the evaporation rate of the pre-treatment liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

The pre-treatment liquid may contain a surfactant. Any known surfactant may be used but preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1 010, or from Nissin Chemical Industry as Surfynol (registered trademark) 465 and Surfynol 61.

The pre-treatment liquid may also contain pigments. Particularly useful for printing on dark or transparent substrates, is a pre-treatment liquid containing a white pigment. The preferred pigment for the aqueous pre-treatment liquid ink is titanium dioxide. Titanium dioxide (T102) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the pre-treatment liquid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TiO_2$.

The titanium dioxide is preferably incorporated into the pre-treatment formulation via a slurry concentrate composition. The amount of titanium dioxide present in the slurry composition is preferably from about 15 wt. % to about 80 wt. %, based on the total slurry weight.

The titanium dioxide pigment may also bear one or more metal oxide surface coatings. These coatings may be applied using techniques known by those skilled in the art. Examples of metal oxide coatings include silica, alumina, aluminasilica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the cationic stabilised capsules of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

The pre-treatment liquid may contain at least one pH adjuster. Suitable pH adjusters include organic amines, NaOH, KOH, $NEt_3$, $NH_3$, HCl, $HNO_3$ and $H_2SO_4$. In a preferred embodiment, the pre-treatment liquid has a pH lower than 7. A pH of 7 or less can advantageously influence the electrostatic stabilization of the capsules, especially when the dispersing groups of the capsules are amines.

B.2. Aqueous Inkjet Ink.

The aqueous inkjet ink according to the present invention includes at least a) an aqueous medium; and b) the dispersion of capsules composed of a polymeric shell surrounding a core. The core contains an oligomer or polymer having at least 3 repeating units comprising a functional group according to general formula I, II or III. The shell further comprises a dispersing group, preferably covalently bonded to the shell, more preferably, the dispersing group is a group selected from the group consisting of a carboxylic acid or salt thereof, a sulfonic acid or salt thereof, a phosphoric acid ester or salt thereof, a phosphonic acid or salt thereof.

The capsules are preferably present in the inkjet ink in amount of no more than 30 wt. %, preferably between 5 and 25 wt. % based on the total weight of the inkjet ink. It was observed that above 30 wt. % jetting was not always so reliable.

In a preferred embodiment, the inkjet ink according to the invention is part of an inkjet ink set, more preferably part of a multi-colour inkjet ink set including a plurality of inkjet inks according to the invention. The inkjet ink set preferably includes at least a cyan inkjet ink, a magenta inkjet ink, a yellow inkjet ink and a black inkjet ink. Such a CMYK-inkjet ink set may also be extended with extra inks such as red, green, blue, violet and/or orange to further enlarge the colour gamut of the image. The inkjet ink set may also be extended by the combination of the full density inkjet inks with light density inkjet inks. The combination of dark and light colour inks and/or black and grey inks improves the image quality by a lowered graininess.

In a preferred embodiment, the inkjet ink set also includes a white inkjet ink. This allows obtaining more brilliant colours, especially on transparent substrates, where the white inkjet ink can be applied either as a primer or on top of the colour inkjet inks when the image is viewed through the transparent substrate.

The viscosity of the inkjet ink is preferably smaller than 25 mPa·s at 25° C. and at a shear rate of 90 $s^{-1}$, more preferably between 2 and 15 mPa·s at 25° C. and at a shear rate of 90 $s^{-1}$.

The surface tension of the inkjet ink is preferably in the range of about 18 mN/m to about 70 mN/m at 25° C., more preferably in the range of about 20 mN/m to about 40 mN/m at 25° C.

The inkjet ink may also contain at least one surfactant for obtaining good spreading characteristics on a substrate.

B.2.1. Solvent

The aqueous medium of the ink contains water, but may preferably include one or more water-soluble organic solvents. Suitable solvents which can be incorporated in the inks are described in § A.3.

B.2.2. Pigments

The pigments of the ink may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548.

The pigment particles are dispersed in an aqueous medium by means of a polymeric dispersant or a surfactant. Self-dispersible pigments may also be used. If combined with capsules having anionic dispersing groups, anionic surfactants may be preferably used as dispersant for the pigment. If combined with capsules having cationic dispersing groups, cationic surfactants may be preferably used as dispersant for the pigment. The latter prevents interaction of the polymeric dispersant with the dispersing groups of capsules which may be included in the inkjet ink (see below), since dispersion stability of the pigment is accomplished by the same technique of electrostatic stabilization as employed for the capsules.

A self-dispersible pigment is a pigment having on its surface covalently bonded anionic hydrophilic groups, such as salt-forming groups or the same groups used as dispersing groups for the capsules, that allow the pigment to be dispersed in an aqueous medium without using a surfactant or a resin. Suitable commercially available self-dispersible colour pigments are, for example, the CAB-0-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer B190plus based upon the principle of dynamic light scattering. The ink is diluted with ethyl acetate to a pigment concentration of 0.002 wt %. The measurement settings of the B190plus are: 5 runs at 23° C., angle of 90°, wavelength of 635 nm and graphics=correction function.

However, for white pigment inkjet inks, the numeric average particle diameter of the white pigment is the same as described in § B.1.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from Lubrisol. A detailed list of non-polymeric as well as some polymeric dispersants is disclosed by MC CUTCHEON. Functional Materials, North American Edition. Glen Rock,N.J.: Manufacturing Confectioner Publishing Co., 1990. p.110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

B.2.3. Resin

The ink jet ink composition according to the invention may further comprise a resin. The resin is often added to the ink jet ink formulation to further achieve a good adhesion of the pigment to the substrate. The resin is a polymer and suitable resins can be acrylic based resins, a urethane-modified polyester resin or a polyethylene wax.

The polyurethane resin may be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin which may be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the unpublished patent application EP16196224.6.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim CA); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the ink jet ink according to the invention, if included, is at least 1 (wt.)% and preferably lower than 30 (wt.)%, more preferably lower than 20 (wt.)%.

B.2.4. Additives

The aqueous inkjet ink may further comprise a surfactant, a humectant and a thickener as an additive. These suitable additives are described in § B.1.

C. Inkjet Printing Method

In a preferred inkjet recording method, the method comprises the steps of:
  a) jetting an aqueous inkjet ink on a substrate, preferably a non-porous substrate, the ink comprising the dispersion of capsules composed of a polymeric shell surrounding a core, the core containing an oligomer or polymer having at least 3 repeating units comprising a functional group according to general formula I, II or III; and
  b) drying the jetted inkjet ink by applying heat such as to obtain a temperature of the jetted ink of at least 60° C., more preferably at least 80° C. Before the jetting of the inkjet ink according to the invention, a pre-treatment or primer can be applied onto the substrate.

In another preferred inkjet recording method, the method comprises the steps of: a) applying an aqueous pre-treatment liquid on a substrate, preferably a non-porous substrate, the pre-treatment liquid comprising the dispersion of capsules composed of a polymeric shell surrounding a core, the core containing an oligomer or polymer having at least 3 repeating units comprising a functional group according to general formula I, II or III the polymeric shell preferably containing a dispersing group is selected from the group consisting of a protonated amine, a protonated nitrogen containing heteroaromatic compound, a quaternized tertiary amine, a N-quaternized heteroaromatic compound, a sulfonium and a phosphonium; b) optionally at least partially dry the applied aqueous pre-treatment liquid by applying heat such as to obtain a temperature of the applied pre-treatment liquid of at least 60° C., preferably 80° C.; c) jetting an aqueous inkjet ink onto the applied pre-treatment liquid, the ink preferably comprising a colorant such as a pigment and more preferably also comprising a resin. More preferably the ink may comprise the dispersion of capsules composed of a polymeric shell surrounding a core, the core containing an oligomer or polymer having at least 3 repeating units comprising a functional group according to general formula I, II or III, d) drying the jetted inkjet. If step b) was not performed, or the drying of the pre-treatment liquid was not completed, the drying in step d) should be performed by applying heat such that the temperature of the jetted ink is of at least 60° C., more preferably at least 80° C.

The substrate in the inkjet recording method may be porous, such as e.g. textile, paper, leather and card board substrates, but is preferably a non-absorbing substrate such as polyethylene, polypropylene, polycarbonate, polyvinyl chloride, polyesters like polyethylene terephthalate (PET), polyethylene naphthalate (PEN), polylactide (PLA) or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 $g/cm^3$ or more.

In another preferred inkjet recording method, the pre-treatment liquid is applied via a technique selected from the group of ink jetting, valve jetting and spraying. More specifically, these techniques of ink jetting and valve jetting allow, the pre-treatment liquid according to the invention to be applied image wise, preferably onto the surfaces whereupon the inkjet ink will be printed to obtain an image. These last means of applying the pre-treatment liquid has the advantage that the amount of required pre-treatment liquid is substantially lower than with other application methods of priming the substrate.

Examples of the heating process to dry the pre-treatment liquid or the inkjet ink according to the invention include, but are not limited to, heat press, atmospheric steaming, high-pressure steaming, THERMOFIX. Any heat source can be used for the heating process; for example, an infrared ray source is employed.

The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step is such that a temperature is preferably obtained below 150° C., more preferably below 100° C. to avoid deformation of the substrate.

A preferred ink jet head for the inkjet printing system to jet the inkjet ink or pre-treatment liquid is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the ink or pre-treatment liquid according to the present invention is not restricted to piezoelectric inkjet printing. Other inkjet print heads can be used and include various types, such as a continuous type, a thermal print head type, a MEM-jet type head and a valve jet type.

EXAMPLES

Materials

All compounds are supplied by TCI Europe unless otherwise specified.

Desmodur N75 BA is a trifunctional isocyanate supplied by Bayer AG.

Lakeland ACP70 is a zwitterionic surfactant supplied by Lakeland Laboratories LTD.

Alkanol XC is an anionic surfactant supplied by Dupont.

Cab-o-Jet 465M is a magenta pigment dispersion supplied by Cabot

Cab-O-Jet 450C is a cyan pigment dispersion supplied by Cabot

Surfinol 104H is a surfactant supplied by Nissin Chemical Industry

Diamond D75 M is a magenta dispersion supplied by Diamond Dispersions.

MNDA is methyldiethanol amine, supplied by Aldrich

Diamond D75Y is a yellow dispersion supplied by Diamond Dispersions.

Diamond D75K is a black dispersion supplied by Diamond Dispersions.

MA-1 is 2-(acetoacetoxy)ethyl methacrylate

MA-2 is 2-prop-2-enoyloxyethyl 3-oxobutanoate and was prepared according to Christopherson C. et al., Journal of Polymer Science, Part A: Polymer Chemistry, 56(22), 2539-2546 (2018).

MA-4 is (4-vinylphenyl)methyl 3-oxobutanoate and is prepared as follows:

Firstly, 4-hydroxymethyl-styrene was prepared as follows: 0.4 g of sodium hydroxide, 32.23 g of tetrabutylammonium bromide and 2.2 g of BHT were added to 400 ml water. The mixture was stirred for 10 minutes at room temperature; 15.62 g of 4-chloromethyl-styrene was added and the mixture was heated to 90° C. for 40 minutes. The reaction mixture was allowed to cool down to room temperature and extracted three times with 100 ml ethyl acetate. The pooled organic fractions were dried over magnesium sulfate and the solvent was removed under reduced pressure. The crude 4-hydroxymethyl-styrene was purified by preparative column chromatography on a Prochrom LC80 column, using Kromasil Si 60 Å 10 µm as stationary phase, using a gradient elution from methylene chloride to methylene chloride/ethyl acetate 80/20 as eluent.

5.76 g (y: 43%) of 4-hydroxymethyl-styrene was isolated (TLC analysis on TLC Silica gel 60 F254, supplied by Merck: eluent methylene chloride/ethyl acetate 90/10: Rf=0.45). Next, (4-vinylphenyl)methyl 3-oxobutanoate was prepared as follows: 11 g of 4-hydroxymethyl-styrene, 19.45 g of tert.butyl acetoacetate and 25 mg of TEMPO were dissolved in 150 ml of toluene. The reaction mixture was heated to reflux, while removing a mixture of tert.butanol and toluene by distillation. The distillation was continued for 90 minutes. The reaction mixture was allowed to cool down to room temperature and the solvent was removed under reduced pressure. The crude (4-vinylphenyl)methyl 3-oxobutanoate was purified by preparative column chromatography on a Prochrom LC80 column, using Kromasil Si 60 Å 10 µm as stationary phase and hexane/ethyl acetate 70/30 as eluent. 12 g (y: 67%) of (4-vinylphenyl)methyl 3-oxobutanoate was isolated (TLC analysis on TLC Silica gel 60 F254 supplied by Merck: eluent hexane/ethyl acetate 70/30: Rf=0.4).

MA-5 is 2-[(4-vinylphenyl)methoxy]ethyl 3-oxobutanoate was prepared as follows:

Firstly, 2-[(4-vinylphenyl)methoxy]ethanol was prepared as follows: 400 ml of tetrahydrofurane was added to 1.19 kg of ethylene glycol. The mixture was stirred at room temperature and 3.98 g of 4-tert.butyl catcheol was added followed by the portion wise addition of 35 g of a 60 w % dispersion of sodium hydride in mineral oil over one hour. During the addition, the temperature rose to 45° C. The mixture was stirred for two hours at room temperature. A solution of 74.19 g of 4-chloromethyl-styrene in 100 ml tetrahydrofurane was added and the reaction was allowed to continue for 48 hours at 45° C. The mixture was added to 500 ml of water and extracted three times with 300 ml of methylene chloride. The pooled organic fractions were dried over sodium sulfate and evaporated under reduced pressure. The crude 2-[(4-vinylphenyl)methoxy]ethanol was purified by preparative column chromatography on a Graceresolve RS80 column, using a gradient elution from methylene chloride to methylene chloride/ethyl acetate 80/20. 64 g (y: 74%) of 2-[(4-vinylphenyl) methoxy]ethanol was isolated (TLC analysis on TLC Silica gel 60 F254, supplied by Merck: eluent methylene chloride/ethyl acetate 90/10: Rf=0.27).

Next, 2-[(4-vinylphenyl)methoxy]ethyl 3-oxobutanoate was prepared as follows: 17.8 g of 2-[(4-vinylphenyl) methoxy]ethanol, 15.82 g of tert.butyl acetoacetate and 31 mg TEMPO were dissolved in 150 ml toluene. The mixture was heated to reflux and a mixture of tert. butanol and toluene was removed by distillation. 20 ml of the mixture was removed in half an hour. After half an hour an additional 7.9 g of tert.butyl acetoacetate was added and the distillation was continued for half an hour. The reaction mixture was allowed to cool down to room temperature and the solvent was removed under reduced pressure. The crude 2-[(4-vinylphenyl) methoxy]ethyl 3-oxobutanoate was purified by preparative column chromatography on a Prochrom LC80 column, using Kromasil Si 60 Å 10 µm as stationary phase and methylene chloride/ethyl acetate 70/30 as eluent. 19.6 g (y: 75%) of 2-[(4-vinyl phenyl)methoxy] ethyl 3-oxobutanoate was isolated (TLC analysis on TLC Silica gel 60 $F_{254}$, supplied by Merck: eluent hexane/ethyl acetate 70/30: Rf=0.3).

MA-6 is 4-prop-2-enoyloxybutyl 3-oxobutanoate and is prepared as follows: 79.1 g of tert-butyl acetoacetate, 86.5 g of 4-hydroxybutyl-acrylate and 5.5 g of BHT were dissolved in 300 ml of toluene. The mixture was heated to reflux. Upon reflux, a mixture of toluene and tert-butanol was removed by distillation. 70 g of the toluene/tert-butanol mixture was removed by distillation over 30 minutes. The mixture was allowed to cool down to room temperature. The solvent was removed under reduced pressure and 4-prop-2-enoyloxybutyl 3-oxobutanoate was purified by preparative column chromatography on a Graceresolve RS80 column, using n-hexane/methylene chloride as eluent. 46.1 g of 4-prop-2-enoyloxybutyl 3-oxobutanoate was isolated (TLC analysis on TLC Silica gel 60 F254 supplied by Merck, using n-hexane/ethyl acetate as eluent: Rf=0.3)

MA-7 is ethyl 3-oxo-2-[(4-vinylphenyl)methyl]butanoate and is prepared as follows: 3.45 g of sodium and 0.49 g of 4-tert.butyl catechol were added to 250 ml of ethanol while cooling the solution to 0° C. The mixture was allowed to stir for 45 minutes at room temperature. 22.8 g of 4-chloromethyl styrene was added to the reaction mixture, followed by the addition of 25 ml of ethanol. 39.04 g of ethyl acetoacetate was added to the reaction mixture followed by the addition of 25 ml ethanol. The reaction mixture was refluxed for three hours. The reaction mixture was allowed to cool down to room temperature and poured into 800 ml water. The mixture was extracted three times with 150 ml of methyl tert.butyl ether. The pooled organic fractions were dried over sodium sulfate and the solvent was removed under reduced pressure. The crude ethyl 3-oxo-2-[(4-vinylphenyl)methyl]butanoate was purified by preparative column chromatography on a Prochrom LC80 column, using Kromasil Si 60 Å 10 μm as stationary phase and methylene chloride/hexane 96/4 as eluent. 16.6 g (y: 45%) of ethyl 3-oxo-2-[(4-vinylphenyl)methyl]butanoate was isolated (TLC analysis on TLC Silica gel 60 F254, supplied by Merck: eluent methylene chloride: Rf=0.3).

MA-14 is N,N-diethyl-3-oxo-2-[(4-vinylphenyl)methyl]butanamide and is prepared as follows: 200 ml ethanol was cooled to 0° C. 0.33 g 4-t.butyl-catechol was added followed by the portion wise addition of 9.2 g of a 25 wt. % dispersion of sodium in paraffin (0.1 mol). The mixture was stirred for 30 minutes at 25° C. 15.2 g 4-chloromethyl-styrene in 25 ml ethanol and 31.4 g N,N-diethyl-3-oxo-butanamide in 25 ml ethanol were added and the reaction was allowed to continue for 6 hours at reflux. The reaction mixture was allowed to cool down to room temperature and the mixture was poured into 400 ml water. The mixture was extracted with 400 ml methyl-t.butyl-ether. The precipitated residues were removed by filtration and the organic fraction was dried over sodium sulfate. The solvent was evaporated under reduced pressure and N,N-diethyl-3-oxo-2-[(4-vinylphenyl)methyl]butanamide was purified by preparative column chromatography on a Prochrom LC 80 column, using a gradient elution from methylene chloride to methylene chloride/ethyl acetate 95/5. 2.2 g of N,N-diethyl-3-oxo-2-[(4-vinylphenyl)methyl]butanamide (y: 8%) was isolated (TLC analysis on TLC Silica gel 60 F254, supplied by Merck, using hexane/ethyl acetate as eluent: Rf: 0.5).

Example 1

The Synthesis of Inventive Resin INVRES-1:

10 g (46.6 mmol) 2-(acetoacetoxy)ethyl methacrylate was dissolved in 30 ml ethyl acetate. 0.472 g (2.33 mmol) dodecyl mercaptane was added and the mixture was purged with nitrogen. 134 mg (0.7 mmol) 2,2″-azobis[2-methylbutyronitrile] was added and the mixture was refluxed for 6 hours. The mixture was allowed to cool down to room temperature. The solution of inventive resin INVRES-1 in ethylacetate was directly used in the synthesis of inventive capsule INVCAP-1.

The molecular weight of INVRES-1 was determined, using GPC relative to poly(styrene) standards. INVRES-1 had a numeric average molecular weight Mn of 10500 and a weight average molecular weight Mw of 15400.

The Preparation of Inventive Capsule INVCAP-1:

13.2 g of Desmodur N75 BA was added to 37 g of the above described solution of INVRES-1 in ethyl acetate. 1.2 g of Lakeland ACP 70 was added and the solution was stirred for an hour at room temperature.

This solution was added to a solution of 3.36 g Lakeland ACP 70, 1.17 g lysine and 1.5 g triethanol amine in 44 g water, while strirring with an Ultra Turrax at a rotation speed 16000 rpm for 5 minutes. 52 g water was added and the solvent evaporated at 60° C. under reduced pressure, while gradually increasing the vacuum from 500 mbar to 120 mbar. The weight of the dispersion was adjusted to 88 g by evaporating water at 120 mbar. The dispersion was stirred for 16 hours at 65° C. The dispersion was allowed to cool down to room temperature and the dispersion was filtered over a 1.6 μm filter.

Average particle sizes of all capsule dispersions were measured using a Zetasizer™ Nano-S (Malvern Instruments, Goffin Meyvis). The average particle size of INVCAP-1 was 183 nm.

Inventive Ink INV-1

Inventive ink INV-1 was prepared by mixing the components according to Table 4. All weight percentages are based on the total weight of the ink jet ink.

TABLE 4

| Mass (wt. %) | INV-1 |
| --- | --- |
| INVCAP-1 | 38 |
| Cab-O-Jet 465M | 22 |
| Surfinol 104H | 2 |
| Dowanol DPM | 19 |
| Ethylene glycol | 19 |

Comparative Ink COMP-1

State of the art poly(urethane) based inks have been disclosed in WO2018077624. Based on WO2018077624, comparative ink COMP-1 has been formulated by mixing the components according to Table 5. All weight percentages are based on the total weight of the ink jet ink.

TABLE 5

| Mass (wt. %) | COMP-1 |
| --- | --- |
| PU-1 | 28.5 |
| Cab-O-Jet 450C | 20 |
| Tego Wet 270 | 0.6 |
| 2-pyrrolidone | 20 |
| 1,2-hexane diol | 20 |
| Water | 10.9 |

PU-1 has been prepared as disclosed in WO2018077624.

The inventive composition INV-1 and comparative composition COMP-1 were coated on polypropylene, using a 10 micron wired bar and dried at 80° C. for 15 minutes in an oven.

The adhesion of each sample was evaluated by a cross-cut test according to ISO2409:1992(E). Paints (International standard 1992-08-15) using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with a criterion described in Table 6, where both the adhesion in the cross-cut and outside the cross-cut were evaluated.

TABLE 6

| Evaluation value | Criterion |
|---|---|
| 0 | Nothing removed, perfect adhesion. |
| 1 | Detachment of only very small parts of the cured layer, almost perfect adhesion |
| 2 | Minor parts of the cured layer was removed by the tape, good adhesion |
| 3 | Parts of the cured layer were removed by the tape, poor adhesion |
| 4 | Most of the cured layer was removed by the tape, poor adhesion |
| 5 | The cured layer was completely removed from the substrate by the tape, no adhesion |

The results are summarized in Table 7

TABLE 7

|  | Adhesion performance |
|---|---|
| Inventive sample | 0 |
| Comparative sample | 5 |

From Table 7, it becomes apparent that the resin technology according to the present invention outperforms state of the art poly(urethane) technology.

The jettability of the inventive ink INV-1 was tested on a standard Dimatix™ 10 pl print head. The ink was jetted at 22° C., using a firing frequency of 5 kHz, a firing voltage of 25 V and a standard waveform. All nozzles jetted without any specific need for purging.

Example 2

This example illustrates the stability of resin based aqueous inks according to the present invention upon storage.

The Preparation of Inventive Capsule INVCAP-2:

8.8 g of Desmodur N75 BA was added to 37 g of the above described solution of I NVRES-1 in ethyl acetate. 1.2 g of Lakeland ACP 70 was added and the solution was stirred for an hour at room temperature.

This solution was added to a solution of 3.36 g Lakeland ACP 70, 1.17 g lysine and 1.5 g triethanol amine in 44 g water, while stirring with an Ultra Turrax at a rotation speed 16000 rpm for 5 minutes. 52 g water was added and the solvent evaporated at 60° C. under reduced pressure, while gradually increasing the vacuum from 500 mbar to 120 mbar. The weight of the dispersion was adjusted to 88 g by evaporating water at 120 mbar. The dispersion was stirred for 16 hours at 65° C. The dispersion was allowed to cool down to room temperature and the dispersion was filtered over a 1.6 μm filter.

The average particle size was 170 nm.

Evaluation of the Ink Stability:

The inventive inks INV-2 to INV-5 were prepared by mixing the components according to Table 8. All weight percentages are based on the total weight of the ink jet ink.

TABLE 8

| Mass(wt. %) | INV-2 | INV-3 | INV-4 | INV-5 |
|---|---|---|---|---|
| INVCAP-2 | 38.5 | 38.5 | 38.5 | 38.5 |
| Diamond D75C | 24 | — | — | — |
| Cab-O-Jet 465M | — | 24 | — | — |
| Diamond D75Y | — | — | 24 | — |
| Diamond D75K | — | — | — | 24 |
| Alkanol XC | 0.5 | 0.5 | 0.5 | 0.5 |
| Methyl diethanol amine | 1 | 1 | 1 | 1 |
| 1,2-propane diol | 18 | 18 | 18 | 18 |
| Glycerol | 18 | 18 | 18 | 18 |

The inventive inks INV-2 to INV-5 were aged at 60° C. for 14 days. The viscosity increase of each ink was monitored. The viscosity increase in all ink samples was less than 10% compared to the starting point, proving the excellent storage stability of the inks according to the present invention.

Example 3

This example illustrates that excellent physical properties can be obtained with a broad scope of encapsulated β-keto-esters based polymers.

Synthesis of β-Keto-Ester Polymers According to the Present Invention

The β-keto-ester polymers according to the present invention were prepared according to the following reaction scheme:

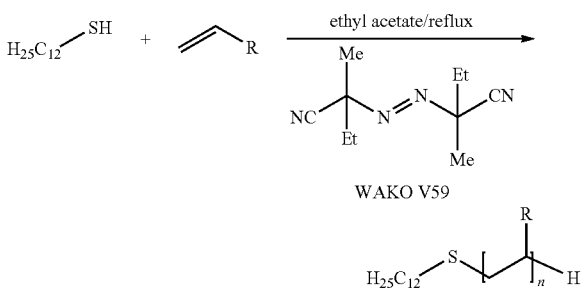

The different polymers were obtained by making mixtures as displayed in Table 9.

TABLE 9

| Ingedients | INVRES-2 | INVRES-3 | INVRES-4 | INVRES-5 | INVRES-6 |
|---|---|---|---|---|---|
| $C_{12}H_{25}SH$ | 0.826 g | 0.413 g | 0.723 g | 1.03 g | 0.826 g |
| MA-2 | 16 g | — | — | — | — |
| MA-4 | — | 8.73 g | — | — | — |
| MA-5 | — | — | 18.36 g | — | — |
| MA-6 | — | — | — | 22.8 g | — |
| MA-7 | — | — | — | — | 19.7 g |
| WAKO V59 | 0.346 g | 0.115 g | 0.206 g | 0.288 g | 0.235 g |
| Ethyl acetate | 43.3 g | 23.8 g | 49.6 g | 61.34 g | 53.4 g |

The mixtures as described in Table 9 were flushed with nitrogen and heated to reflux for 16 hours, unless otherwise specified. The monomer conversion was followed using TLC analysis, up to complete conversion. The reaction mixtures were allowed to cool down to room temperature and the ethyl acetate solutions were used for encapsulation without isolating the polymers.

INVRES-3: The polymerization was allowed to continue for 60 hours instead of 16 hours. After 60 hours, an additional 0.146 g of WAKO V59 in 1 g ethyl acetate was added and the mixture was further refluxed for 7 hours. An extra 0.146 g of WAKO V59 in 2 g of ethyl acetate was added and the polymerization was allowed to continue for an additional 16 hours at reflux. The conversion proved to be almost complete based on TLC-analysis.

INVRES-4: After 16 hours, an additional 0.396 g of WAKO V59 in 2 g of ethyl acetate was added and the polymerization was allowed to continue for an additional 24 hours at reflux. The conversion proved to be complete based on TLC analysis.

INVRES-6: After 16 hours, an additional 0.4 g of WAKO V59 in 2 g of ethyl acetate was added and the polymerization was allowed to continue for an additional 24 hours at reflux. The conversion proved to be complete based on TLC analysis.

INVRES-7: INVRES-7 was prepared according following reaction:

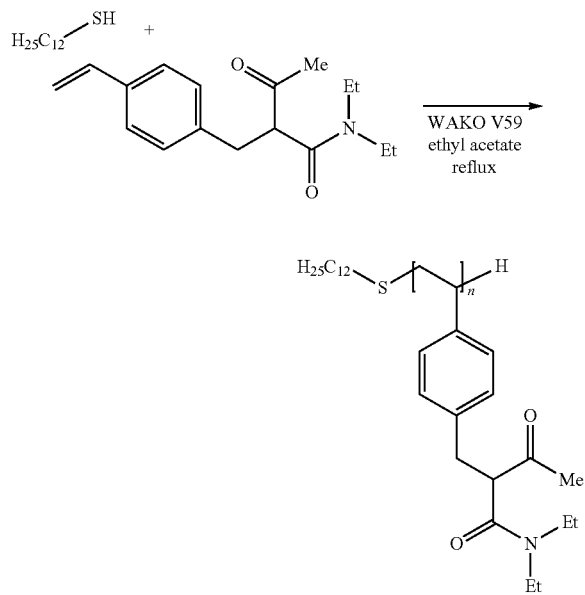

1.63 g of MA-14 was dissolved in 4.47 g ethyl acetate. The reaction mixture was purged with nitrogen. 62 mg of 1-dodecyl mercaptane was added followed by the addition of 23 mg WAKO V59 in 0.5 g ethyl acetate. The mixture was refluxed for 64 hours. After 64 hours, an additional 23 mg WAKO V59 in 0.5 g ethyl acetate was added and the polymerization was allowed to continue for 7 hours at reflux. An additional 30 mg WAKO V59 in 0.5 g ethyl acetate was added and the polymerization was allowed to continue for an additional 16 hours at reflux. The conversion proved to be complete based on TLC analysis.

The molecular weights of INVRES-2 to INVRES-7 were measured using GPC relative to polystyrene standards and are given in Table 10.

TABLE 10

|  | Mn | Mw |
| --- | --- | --- |
| INVRES-2 | 10700 | 14008 |
| INVRES-3 | 12900 | 21200 |
| INVRES-4 | 16800 | 32300 |
| INVRES-5 | 10500 | 13500 |
| INVRES-6 | 24000 | 37100 |
| INVRES-7 | 19400 | 31900 |

Preparation of Inventive Capsules INVCAP-3 to INVCAP-8 INVCAP-3:

9.26 g of Desmodur N75 BA was added to 60.4 g of the above described solution of INVRES-2 in ethyl acetate.

This solution was added to a solution of 3.07 g of Lakeland ACP 70, 0.79 g of lysine and 1.1 g of triethyl amine in 80 g water, while stirring with an Ultra Turrax at a rotation speed 17000 rpm for 5 minutes. 80 g water was added and the solvent evaporated at 60° C. under reduced pressure, while gradually increasing the vacuum from 500 mbar to 120 mbar. The weight of the dispersion was adjusted to 110 g by evaporating water at 120 mbar. The dispersion was stirred for 24 hours at 60° C. The dispersion was allowed to cool down to room temperature and the dispersion was filtered over a 1.6 μm filter.

The average particle size was 200 nm.

INVCAP-4:

5.15 g of Desmodur N75 BA was added to 33.6 g of the above described solution of INVRES-3 in ethyl acetate.

This solution was added to a solution of 1.72 g of Lakeland ACP 70, 0.44 g of lysine and 0.61 g of triethyl amine in 39.3 g water, while stirring with an Ultra Turrax at a rotation speed 17000 rpm for 5 minutes. 80 g water was added and the solvent evaporated at 60° C. under reduced pressure, while gradually increasing the vacuum from 500 mbar to 120 mbar. The weight of the dispersion was adjusted to 100 g by evaporating water at 120 mbar. The dispersion was stirred for 24 hours at 60° C. The dispersion was allowed to cool down to room temperature and the dispersion was filtered The average particle size was 195 nm.

INVCAP-5:

9.55 g of Desmodur N75 BA was added to 62.28 g of the above described solution of INVRES-4 in ethyl acetate.

This solution was added to a solution of 3.18 g of Lakeland ACP 70, 0.82 g of lysine and 1.14 g of triethyl amine in 72.7 g water, while stirring with an Ultra Turrax at a rotation speed 17000 rpm for 5 minutes. 80 g water was added and the solvent evaporated at 60° C. under reduced pressure, while gradually increasing the vacuum from 500 mbar to 120 mbar. The weight of the dispersion was adjusted to 100 g by evaporating water at 120 mbar. The dispersion was stirred for 24 hours at 60° C. The dispersion was allowed to cool down to room temperature and the dispersion was filtered over a 1.6 μm filter.

The average particle size was 200 nm.

INVCAP-6:

10.5 g of Desmodur N75 BA was added to 68.5 g of the above described solution of INVRES-5 in ethyl acetate.

This solution was added to a solution of 3.5 g Lakeland ACP 70, 0.9 g lysine and 1.25 g triethyl amine in 80 g water, while stirring with an Ultra Turrax at a rotation speed 17000 rpm for 5 minutes. 80 g water was added and the solvent evaporated at 60° C. under reduced pressure, while gradually increasing the vacuum from 500 mbar to 120 mbar. The weight of the dispersion was adjusted to 110 g by evaporating water at 120 mbar. The dispersion was stirred for 24 hours at 60° C. The dispersion was allowed to cool down to room temperature and the dispersion was filtered over a 1.6 µm filter.

The average particle size was 180 nm.

INVCAP-7:

9.55 g of Desmodur N75 BA was added to 62.28 g of the above described solution of INVRES-6 in ethyl acetate.

This solution was added to a solution of 3.18 g Lakeland ACP 70, 0.82 g lysine and 1.14 g triethyl amine in 72.73 g water, while stirring with an Ultra Turrax at a rotation speed 17000 rpm for 5 minutes. 80 g water was added and the solvent evaporated at 60° C. under reduced pressure, while gradually increasing the vacuum from 500 mbar to 120 mbar. The weight of the dispersion was adjusted to 100 g by evaporating water at 120 mbar. The dispersion was stirred for 24 hours at 60° C. The dispersion was allowed to cool down to room temperature and the dispersion was filtered over a 1.6 µm filter.

The average particle size was 215 nm.

INVCAP-8:

0.888 g of Desmodur N75 BA was added to 5.79 g of the above described solution of INVRES-7 in ethyl acetate.

This solution was added to a solution of 0.296 g Lakeland ACP 70, 0.076 g of lysine and 0.106 g of triethyl amine in 6.760 g water, followed by emulsification of the ethyl acetate solution in the aqueous solution using ultrasound (SONICS VIBRA CELL) at full power for 1 minute, without pulse. 10 g water was added and the solvent evaporated at 60° C. under reduced pressure, while gradually increasing the vacuum from 500 mbar to 120 mbar. The weight of the dispersion was adjusted to 9.4 g by evaporating water at 120 mbar. The dispersion was stirred for 24 hours at 60° C. The dispersion was allowed to cool down to room temperature and the dispersion was filtered over a 1.6 µm filter.

The average particle size was 150 nm.

Inventive Inks INV-6 to INV-11:

Inventive inks INV-6 to INV-11 were prepared by mixing the components according to Table 11. All weight percentages are based on the total weight of the ink jet ink.

TABLE 11

| Weight % of | INV-6 | INV-7 | INV-8 | INV-9 | INV-10 | INV-11 |
|---|---|---|---|---|---|---|
| INVCAP-3 | 39 | — | — | — | — | — |
| INVCAP-4 | — | 39 | — | — | — | — |
| INVCAP-5 | — | — | 39 | — | — | — |
| INVCAP-6 | — | — | — | 39 | — | — |
| INVCAP-7 | — | — | — | — | 39 | — |
| INVCAP-8 | — | — | — | — | — | 39 |
| Cab-O-Jet 465M | 21 | 21 | 21 | 21 | 21 | 21 |
| Surfinol 104H | 2 | 2 | 2 | 2 | 2 | 2 |
| Glycol | 19 | 19 | 19 | 19 | 19 | 19 |
| Dowanol DPM | 19 | 19 | 19 | 19 | 19 | 19 |

The inventive inks INV-6 to INV-11 were evaluated for adhesion on a polypropylene sheet as in Example 1. The results are summarized in Table 12

TABLE 12

| | Adhesion performance |
|---|---|
| INV-6 | 0 |
| INV-7 | 0 |
| INV-8 | 1 |

TABLE 12-continued

| | Adhesion performance |
|---|---|
| INV-9 | 0 |
| INV-10 | 0 |
| INV-11 | 0 |

From Table 12, it becomes apparent that a broad scope of encapsulated β-keto-ester functionalized polymers give excellent adhesion to poly(propylene).

The invention claimed is:

1. An aqueous inkjet ink comprising a pigment and an aqueous dispersion of capsules, wherein the capsules comprise a polymeric shell surrounding a core, the core comprising an oligomer or polymer having at least 3 repeating units comprising a functional group according to formula I, II, or III:

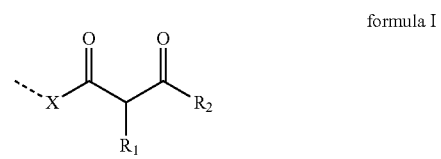

formula I

formula II

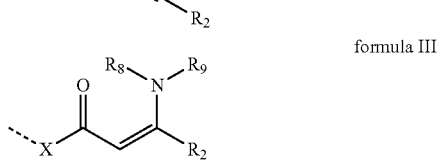

formula III wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $C(=O)R_3$, and CN;

$R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, and $C(=O)R_3$, or $R_1$ and $R_2$ may represent the necessary atoms to form a five to eight membered ring, $R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$, and $NR_5R_6$;

$R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

$R_5$ and $R_6$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_5$ and $R_6$ may represent the necessary atoms to form a five to eight membered ring;

X is selected from the group consisting of O and $NR_7$;

$R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group; and $R_8$ and $R_9$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_8$ and $R_9$ may represent the necessary atoms to form a five to eight membered ring.

2. An inkjet recording method comprising the step of:
a) jetting inkjet ink as defined in claim 1 on a substrate; and
b) drying the jetted inkjet ink by applying heat so as to obtain a temperature of the jetted inkjet ink of at least 60° C.

3. The aqueous inkjet ink according to claim 1, wherein the polymeric shell comprises a poly (urea), a poly(urethane), or a combination thereof.

4. The aqueous inkjet ink according to claim 1, wherein the oligomer or polymer comprises at least 15 repeating units.

5. The aqueous inkjet ink according to claim 1, wherein a dispersing group is covalently bonded to the polymeric shell.

6. The aqueous inkjet ink according to claim 3, wherein a dispersing group is covalently bonded to the polymeric shell.

7. The aqueous inkjet ink according to claim 5, wherein the dispersing group is selected from the group consisting of a carboxylic acid or salt thereof, a sulfonic acid or salt thereof, a phosphoric acid ester or a salt thereof, and a phosphonic acid or salt thereof.

8. The aqueous inkjet ink according to claim 6, wherein the dispersing group is selected from the group consisting of a carboxylic acid or salt thereof, a sulfonic acid or salt thereof, a phosphoric acid ester or a salt thereof, and a phosphonic acid or salt thereof.

9. The aqueous inkjet ink according to claim 5, wherein the dispersing group is selected from the group consisting of a protonated amine, a protonated nitrogen containing heteroaromatic compound, a quaternized tertiary amine, a N-quaternized heteroaromatic compound, a sulfonium, and a phosphonium.

10. The aqueous inkjet ink according to claim 6, wherein the dispersing group is selected from the group consisting of a protonated amine, a protonated nitrogen containing heteroaromatic compound, a quaternized tertiary amine, a N-quaternized heteroaromatic compound, a sulfonium, and a phosphonium.

11. An inkjet recording method comprising the step of:
a) jetting inkjet ink as defined in claim 3 on a substrate; and
b) drying the jetted inkjet ink by applying heat so as to obtain a temperature of the jetted inkjet ink of at least 60° C.

12. An inkjet recording method comprising the step of:
a) jetting the inkjet ink as defined in claim 4 on a substrate; and
b) drying the jetted inkjet ink by applying heat so as to obtain a temperature of the jetted inkjet ink of at least 60° C.

13. An inkjet recording method comprising the step of:
a) jetting the inkjet ink as defined in claim 5 on a substrate; and
b) drying the jetted inkjet ink by applying heat so as to obtain a temperature of the jetted inkjet ink of at least 60° C.

14. An inkjet recording method comprising the step of:
a) jetting the inkjet ink as defined in claim 6 on a substrate; and
b) drying the jetted inkjet ink by applying heat so as to obtain a temperature of the jetted inkjet ink of at least 60° C.

15. An inkjet recording method comprising the step of:
a) jetting the inkjet ink as defined in claim 7 on a substrate; and
b) drying the jetted inkjet ink by applying heat so as to obtain a temperature of the jetted inkjet ink of at least 60° C.

16. An inkjet recording method comprising the step of:
a) jetting the inkjet ink as defined in claim 8 on a substrate; and
b) drying the jetted inkjet ink by applying heat so as to obtain a temperature of the jetted inkjet ink of at least 60° C.

17. An inkjet recording method comprising the step of:
a) jetting the inkjet ink as defined in claim 9 on a substrate; and
b) drying the jetted inkjet ink by applying heat so as to obtain a temperature of the jetted inkjet ink of at least 60° C.

18. An inkjet recording method comprising the step of:
a) jetting the inkjet ink as defined in claim 10 on a substrate; and
b) drying the jetted inkjet ink by applying heat so as to obtain a temperature of the jetted inkjet ink of at least 60° C.

\* \* \* \* \*